United States Patent [19]

Salm et al.

[11] Patent Number: 4,607,988
[45] Date of Patent: Aug. 26, 1986

[54] REVERSIBLE CUTTING BIT

[75] Inventors: Franz Salm, Ettingen; Eduard Zängerle, Au; Jean-Fracois Muriset, Kerzers, all of Switzerland

[73] Assignee: Herrli AG, Switzerland

[21] Appl. No.: 678,287

[22] Filed: Dec. 5, 1984

[30] Foreign Application Priority Data

Dec. 7, 1983 [DE] Fed. Rep. of Germany ....... 3344233

[51] Int. Cl.$^4$ .......................................... B23B 49/00
[52] U.S. Cl. .................................. 407/114; 407/104
[58] Field of Search ............... 407/104, 105, 109, 113, 407/114

[56] References Cited

U.S. PATENT DOCUMENTS

| 3,226,797 | 1/1966 | Hertel | 407/104 |
| 3,303,553 | 2/1967 | Severson | 407/104 |
| 3,541,655 | 11/1970 | Stier | 407/113 |
| 3,902,232 | 9/1975 | Hertel | 407/104 |

FOREIGN PATENT DOCUMENTS

| 2302304 | 4/1976 | Fed. Rep. of Germany . |
| 2637757 | 5/1978 | Fed. Rep. of Germany . |
| 3204999 | 8/1983 | Fed. Rep. of Germany . |

Primary Examiner—W. D. Bray
Attorney, Agent, or Firm—Steele, Gould & Fried

[57] ABSTRACT

A reversible cutting bit has, in a view of the bit plane, cutting projections which are at an angle of approximately 90° to one another, so that the basic shape of the reversible cutting bit is angular. In order to obtain reversible symmetry, the cutting bit is constructed in fold-symmetrical manner to a fold axis located in the angle bisector between the projections, so that the in each case not used cutting edge is located on the bottom of the cutting bit.

19 Claims, 4 Drawing Figures

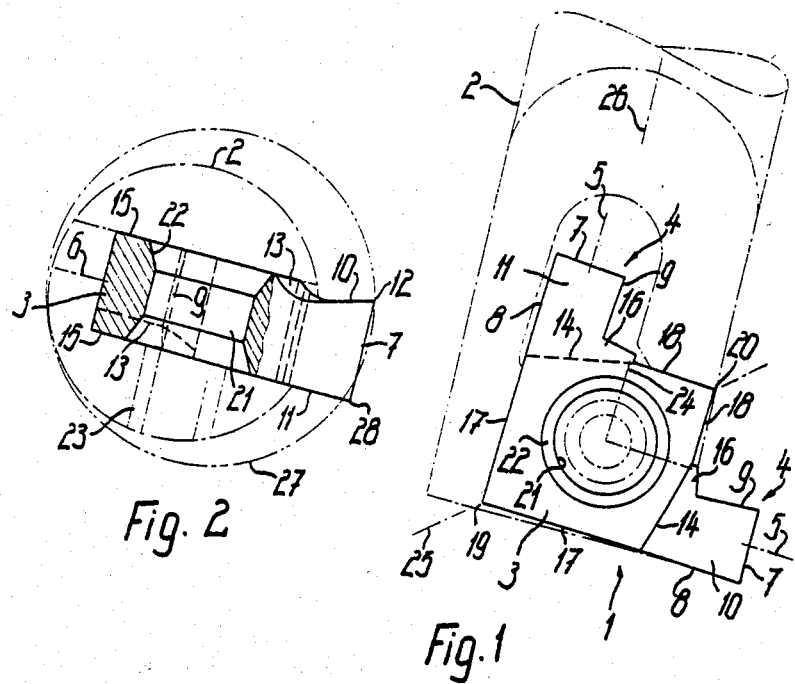
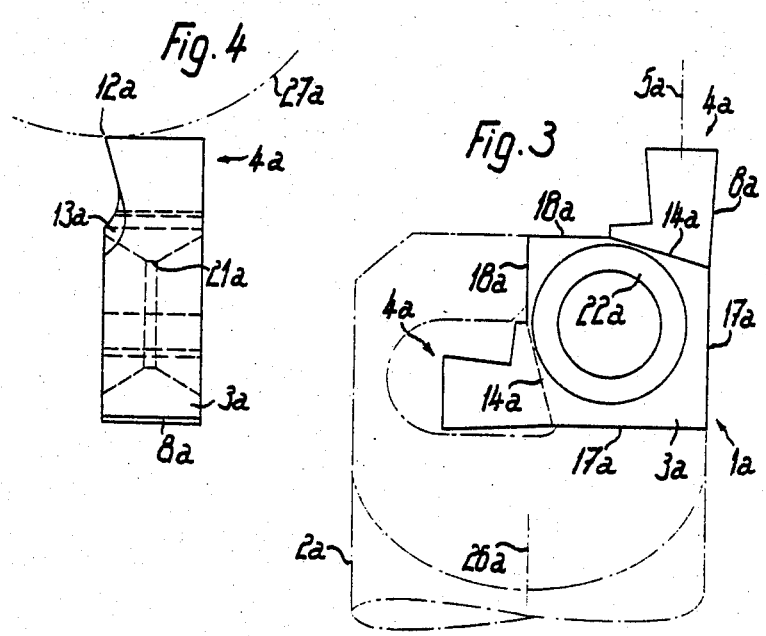

REVERSIBLE CUTTING BIT

BACKGROUND OF THE INVENTION

The present invention relates to a reversible cutting plate with at least two separate, similar cutting edges for cutting tools having a cuttin bit holder with adjustment surfaces in three spatial planes for the identically oriented supporting of bearing faces in at least two reset cutting positions of the reversing-symmetrical cutting bit which is at right angles to the cutting movement direction, the cutting edges being provided in in each case the same geometrical arrangement to the associated bearing face in such a way that the particular cutting edge in the associated reset cutting position is in the same dimensionally stable position relative to the cutting bit holder as at least one further cutting edge in the reset cutting position associated therewith, the cutting edges being provided at the ends of projections of a plate-like body, whose surfaces and edge faces form the bearing faces.

Reversible cutting bits of the aforementioned type are known, in which the projections, which at the end in each case form a cutting edge, which project from the body either in a straight line or laterally reciprocally displaced in opposite directions. In the first case, a linear elongated cutting bit is obtained, whilst in the second case the latter is double-angular in elevation. In both cases the projection which is not in the cutting attachment projects in the opposite direction to the projection in said cutting attachment and in this direction requires adequate space for the housing thereof. Particularly in the case of cutting processes taking place under confined space conditions, such as e.g. during profile turning, thread cutting, producing recesses and surface turning in narrow bores or ring channels, the smaller the dimensions of the parts to be worked, the more difficult the working, because the spatial extension of the cutting bit and/or cutting bit holder place limits thereon. For example, if an inner face is to be turned and the projections of the reversible cutting bit project in opposite directions, then the smallest internal diameter which can still be turned with said cutting bit is larger than the spacing between the cutting edges of the reversible cutting bit. In practice, it has been found that the smallest internal diameter which can be worked with the known reversible cutting bits is approximately 20 mm. A further disadvantage of the known construction is that the cutting edge which is not in the cutting attachment is located on the same surface as the cutting edge in the cutting attachment, so that the particular cutting edge which is not in use is unprotected and is exposed to influences which could cause damage.

SUMMARY OF THE INVENTION

The problem of the present invention is to provide a reversible cutting bit of the aforementioned type which, in the case of simple construction, high strength and maximum cutting depth has a very small spatial extension and in which the particular cutting blade not intended for the cutting attachment can be protected from damage.

According to the invention, this problem is solved in the case of a reversible cutting bit of the aforementioned type in that, in plan view on at least one cutting edge, the projections are at an angle to one another and the two cutting edges associated with one another with respect to the dimensionally stable resetting are located on opposite surfaces of the cutting bit.

If, e.g. for the internal turning of a concave inner face or a convex outer face located in an annular channel, this cutting bit is arranged on the rod-like toolholder in such a way that the cutting projection is at right angles or approximately at right angles to the longitudinal axis of the clamp-on toolholder, then the non-cutting projection is located in the longitudinal direction of the toolholder, so that despite the reversibility of the cutting bit, the cutting tool takes up minimal space in the radial direction of the workpiece. At the same time, the cutting edge which is not to be used is covered and consequently protected towards the bearing face of the cutting bit holder. As the length of the projection influences the radial extension of the cutting tool only once and not twice as in the case of the known solutions, the cutting bit according to the invention is also suitable for producing relatively deep recesses or the like. It has been found that under otherwise substantially identical conditions the construction according to the invention makes it possible to work internal diameters of down to 12 mm and below.

According to a particularly simple embodiment the precise dimensional stability on reversing the reversible cutting bit is achieved in that the projections and/or bearing faces and in particular the complete cutting bit are constructed fold-symmetrically to an imaginary fold axis in the angle bisector between the projections and in the centre of the cutting bit thickness, the body appropriately having parallel surfaces. By reversing about this fold axis, in each case the other cutting edge is brought into the cutting position and this cutting edge is in precisely the same geometrical orientation to the toolholder as the other cutting edge was previously, so that there is no need to reset the cutting edge with respect to the rotation axis and instead further work can immediately take place in a dimensionally stable manner.

As a function of the intended use, the projections can be under an angle to one another which is between approximately 60° and 120°. However, the broadest and most varied range of uses for the cutting bit is obtained if the projections are at an angle of precisely 90° to one another, because then the cutting bit can have a minimum extension in the longitudinal direction of the particular projection.

For the secure, rigid and vibration-free supporting of the cutting bit on the tool holder, it is also advantageous if the bearing surfaces formed by the edge faces, in plan view on at least one cutting edge, are at approximately the same angles to one another as the projections and/or are parallel to the median planes thereof.

According to a further feature of the invention, the plan view of the particular cutting edge, with the outer side face of the projection passes in a substantially approximately linear manner into the associated edge face of the body and is preferably approximately in one plane therewith, so that on the one hand there is an even further improvement to the compactness of the cutting bit, on the other hand it is ensured that this side face and the associated bearing face of the body can be accurately and rationally worked in one pass or through-feed, e.g. by grinding.

In order, more particularly when producing recesses to obtain side clearance angles on the projection, in plan view of the particular cutting edge, the projection can be widened towards its outer end by a sloping construction of its inner and/or its outer side face. If only the inner side face slopes to the edge face of the body passing into the outer side face, the clearance angle on the outer side face can be obtained in that the cutting bit is arranged on the tool holder sloping under a corresponding angle of a few degrees or is oriented in sloping manner with respect to the rotation axis. However, the outer side face can also pass with an acute angle of slightly less than 180° into the following edge face of the body so that a free cut on the outer side face of the projection in the cutting attachment is also obtained in the case of parallel orientation of the projection not in the cutting attachment with respect to the tool holder and in the case of parallel orientation of the longitudinal axis of the tool holder with respect to the rotation axis.

In order to further improve the support of the cutting bit on the toolholder, with the particularly cutting edge are associated as bearing surfaces an edge face which is at right angles to the median plane of the associated projection on the side of the body remote from said projection and also a further edge face which is at right angles to the firstmentioned edge face, said last-mentioned edge face being adjacent to the inner side face of the projection in the vicinity of the base thereof and on the same side. Thus, the cutting forces acting both in the longitudinal direction of the projection and parallel to the rotation axis are readily absorbed in the case of a spatially small construction of the cutting bit. This is still further improved, particularly with a view to the cutting forces acting in the longitudinal direction of the projection if, in elevation parallel to the bit plane on the end face of the projection, the particular cutting edge is located substantially within the projection of the bearing face remote therefrom.

The body acquires a simple and in particular substantially square base shape, if the two bearing faces adjacent to the two inner side faces of the projection and/or the two bearing faces passing into the outer side faces of the projection directly pass into one another at an angle.

In order to further increase the maximum cutting forces which can be absorbed by the reversible cutting bit and consequently in order to increase the cutting depth, cutting speed, feed rate and recess depth which working can take place with the cutting bit, the particular projection passes into the body by means of a widened base portion, the latter preferably projecting exclusively over the inner side face of the remaining projection. Thus, the forces acting on the cutting edge at the end of the projection can be introduced in large-area manner into the body supported on the tool holder. This also makes it possible for obtaining a good chip flow and without any disadvantageous cross-sectional weakening of the projection, to extend a chip groove into said base portion.

According to another feature of the invention, a through-bore for a locking screw or the like of the cutting bit holder is provided in the body approximately at right angles to the bit plane, the through-bore preferably having on both bit sides bore portions tapering conically with an acute angle towards the centre of the bit. By means of this locking screw and without any further fastening means, the cutting bit can be securely and rigidly fixed to the cutting bit holder. If the median axis of this through-bore is slightly further from the bearing faces of the body formed by the edge faces, than the reception bore for the screw formed e.g. by a tapped hole and located in the bit holder from the associated mating surfaces for the bearing faces, then as a result of its eccentricity, during tightening the locking screw simultaneously ensures that the said bearing faces of the cutting bit are pressed against the mating surfaces of the cutting bit holder and consequently automatically ensures an exact orientation of the cutting bit with respect to the tool holder.

In order to obtain maximum supporting surfaces for the locking screw and large edge faces as bearing faces in the case of a compact construction of the cutting bit, the bearing faces adjacent to the inner side faces of the projections and/or the boundary edges of chip grooves remote from the cutting edges are positioned approximately tangentially to the largest circumference of the throughbore. In addition, these bearing faces can pass into the widened base portion of the associated projection in the vicinity of the axial plane of the through-bore which is approximately at right angles to the particular bearing face.

According to another development of the invention, the projection extends by an amount over the body which is approximately the same or smaller than half the edge dimension of the preferably square body. The largest width of the projection is appropriately approximately half the width of the body measured in the same direction and preferably the outer end of the projection is narrower than this.

Apart from being usable for internal turning, the reversible cutting bit according to the invention is also widely suitable for external turning and particularly in this case it can be arranged on the toolholder in such a way that the projection in the cutting attachment is roughly oriented in the longitudinal direction of the longitudinal axis of the toolholder. Both the reversible cutting bit and the toolholder provided for its use in accordance with the present invention can be manufactured with high precision in a simple manner and at low cost.

BRIEF DESCRIPTION OF THE DRAWINGS

The invention is described in greater detail hereinafter relative to non-limitative embodiments and the attached drawings, wherein show:

FIG. 1 the working end of a cutting tool provided with a reversible cutting bit according to the invention in plan view.

FIG. 2 the cutting tool according to FIG. 1 in a view of the end face.

FIG. 3 another embodiment of a cutting tool in the representation according to FIG. 1.

FIG. 4 the cutting bit of the tool according to FIG. 3 in a view from the right.

DETAILED DESCRIPTION OF THE PREFERRED EMBODIMENTS

As can be gathered from FIGS. 1 and 2, a reversible cutting bit 1 according to the invention and represented in continuous line form is fixed to a cutting bit holder 2 represented in dot-dash line form and which in the present embodiment is constructed as a clamp-on toolholder, i.e. a toolholder to which the cutting bit 1 is fixed by clamping or tension.

Cutting bit 1 has a substantially solid base 3, whose geometrical basic configuration is approximately square, i.e. also rectangular and whose thickness is at least approcimately one third and preferably approximately a half of its edge size. Two projections 4 are provided on the body 3 on two outer edges passing into one another at an angle, as well as in the vicinity of the ends of said two outer edges which are remote from one another. The median planes 5 of these projections 4 are at right angles to the median plane 6 of the plate-like body 3 and in the represented embodiment are at an angle of 90° to one another. On all its remaining edge sides, body 3 is free from projections and has a substantially smooth surface, so that in all there are two projections which are at an angle to one another.

Each projection has an end face 7 which is approximately at right angles to median plane 6, an outer side face 8 passing into end face 7, as well as an inner side face 9 which also passes into the latter, a back face 10 located on the surface of body 3 and a base surface 11 located on the bit side remote therefrom. The arrangement of faces 7 to 9, particularly if the cutting bit is used for profile turning, is determined by the profile which is desired. In the represented embodiment, the cutting bit is particularly suitable for producing recesses with a rectangular cross-section. At the intersection of end face 7 and back face 10, projection 4 forms a cutting edge 12, the angle of the faces forming the latter being adapted to the requirements of the material to be worked. The ends of cutting edge 12 are defined by the side faces 8, 9 and the end face 7 of projection 4 forms the cutting edge breast face. The back face 10 passes in the direction of body 3 tangentially into a concave chip guiding face 13, which rises from back face 10 towards body 3 and whose boundary edge remote from edge 7 is designated by the reference numeral 14. This boundary edge 14 is located in the associated planar surface 15 of body 3, provided parallel to the median plane 6, in such a way that the two surfaces 15 of the body 3 are parallel to one another. Each cutting edge 12 is also located in the plane of one of the surfaces 15, whilst the base surface 11 of each projection 4 passes uninterruptedly in equiplanar manner into the other surface 15.

In a view of the particular bit surface 15, each projection 4 passes via a widened base portion 16 into body 3, the width of portion 16 approximately corresponding to half the edge size of the surfaces 15 of body 3, whilst its extension in the longitudinal direction of projection 4 is approximately equal to one sixth of the total length of projection 4.

Edge faces of body 3 serve as bearing faces 17, 18 for the orientation and supporting with respect to the cutting bit holder 2. Said faces are at right angles to the median plane 6 and pass from one surface 15 to the other. The two outer bearing faces 17 form flat extensions of the outer side faces 8 of projections 4, are at right angles to one another and pass into one another in a corner angle 19 of body 3.

The bearing faces 18 adjacent to the inner side faces 9 of projections 4 are connected to the particular associated base portion 16, are approximately at right angles to the particular associated side faces and are at right angles to the median plane 6, whilst also passing from one surface 15 to the other. Bearing faces 18 pass into one another in a corner angle 20 of body 3 which diagonally faces corner angle 19. In each case two bearing faces 17, 18 which are at an angle to one another support the reversible cutting bit 1 on mating surfaces of the correspondingly constructed cutting bit holder. The third bearing surface at right angles thereto is in each case constituted by the surface 15 of body 3 which is remote from the inserted cutting edge 12 and with which is associated a corresponding mating surface on the tool holder. In the represented embodiment, tool holder 2 substantially has a round bar, provided on the working end with a flattened portion parallel to its central axis, in such a way that the thickness of the tool holder in the vicinity of the flattened portion corresponds to approximately half the diameter of the round bar, plus half the thickness of the body 3 of the reversible cutting bit 1. Into said flattened portion is worked a depression adapted to the outer contour of the reversible cutting bit 1, and whose base surface forms the mating surface for the surface 15 to be supported and whereof two lateral boundary faces are arranged in such a way that they form the mating surfaces for the two bearing faces 17, 18 of body 3 which are in use. The arrangement is such that, based on the projection 4 intended for the cutting attachment, the bearing surface 17 remote therefrom and at right angles to its median plane 5, as well as the bearing face 18 at right angles thereto and adjacent to the other projection 4 are used for supporting purposes.

The body 3 contains a through-bore 21, whose central axis is at right angles to median plane 6, and which is located in the angle bisector between the two median planes 5 of projections 4. This through-bore 21 is provided at both ends of a cylindrical middle portion with outwardly conically widening bore portions 22, extending in each case up to the associated surface 15. Through-bore 21 receives a not further shown locking screw, whose corresponding frustum-shaped head engages on the bore portion 22 located at the free surface 15 of body 3 and whose screwed shank engages in a tapped hole 23 in the cutting bit holder 2, which passes through the base surface of the recess for receiving body 3. In the represented embodiment, the lateral boundaries of the base portion 16 connected to the bearing faces 18 are approximately located in two axial planes 20 of through-bore 21 which are at right angles to one another. The extension of the particular base portion 17 increases slightly from its boundary in the longitudinal direction of the associated projection 4 to its inner side face 9. In addition, the boundary edge 14 of the associated chip guide face 13 extends from this boundary. The boundary edge 14 slopes with respect to the median plane 5 in such a way that its distance from the end face 7 increases in the direction of the outer side face 8 and consequently the chip guide face extends into body 3.

The reversible cutting bit 1 is constructed in fold-symmetrical manner to a fold axis 25, which is located in the angle bisector between the projections 4 and/or between their median planes 5, as well as the median plane 6.

Thus, one cutting edge 7 with the associated back face 10 and the associated chip guide face 13 are located on one surface 15 and the cutting edge 7, together with the back face 10 and chip guide face 13 of the other projection 4 are located on the other surface 15 of the cutting bit. By reversing the cutting bit 1 about the fold axis 25, in each case other projection 4 is brought into its position for the cutting attachment in which it assumes precisely the same dimensionally stable position with respect to the cutting bit holder 2 as the other projection beforehand.

FIGS. 1 and 2 show the cutting bit 1 arranged on the cutting bit holder 2 in such a way that the projection 4 intended for the cutting attachment is approximately at right angles to the central axis 26 of the cutting bit holder 2, whilst projecting over the periphery thereof, whereas the other projection is oriented approximately in the longitudinal direction of cutting bit bolder 2 and its cutting edges covered in the same protected by the base surface of the recess. In order that the outer side face 8 of the projection 4 intended for the cutting attachment has a clearance angle with respect to the rotation axis, by a corresponding arrangement of the mating surfaces for the bearing surfaces 17, 18, cutting bit 2 slopes with respect to the cutting bit holder 2 under an angle of a few degrees. As a result of the construction according to the invention, a very small diameter is obtained on which the cutting tool can still carry out internal turning. In FIG. 2, this minimum diameter is shown in dash-double dot form. In order that working can take place on this internal diameter, it is merely necessary to reduce projection 4 in the vicinity of the edge 28 remote from cutting edge 12, by grinding or the like. It is also conceivable to reduce diameter 27 by reducing the cross-section of the cutting bit holder 2 adjacent to the effective bearing face 17.

Apart from being suitable for internal turning, the tool according to FIGS. 1 and 2 is also suitable for external turning. For the latter and for producing end recesses, a construction according to FIGS. 3 and 4 is particularly advantageous. In FIGS. 3 and 4, corresponding parts carry the same reference numerals as in FIGS. 1 and 2, but followed by the letter "a". As is shown in FIG. 3, the boundary edges 14a of the chip guide face 13a, as well as the bearing faces 18a in a view of the cutting bit are approximately tangential to the largest diameter of the bore portions 22a, so that the central axis of through-bore 21a is slightly closer to bearing faces 18a than to bearing faces 17a. The outer side faces 8a of projections 4a pass into the adjacent bearing face 17a, in in each case an obtuse angle of slightly less than 180°. Thus, on the outer side face 8a of the projection 4a intended for the cutting attachment, a clearance angle is still formed if the cutting bit 1a is arranged so that the median plane 5a of said projection 4a is at right angles to the surface to be worked. In the represented embodiment, the mating surfaces for the in each case active bearing surfaces 17a, 18a of cutting bit 1a are arranged on the cutting bit holder 2a, in such a way that the projection 4a intended for the cutting attachment is oriented approximately parallel to the central axis 26a and projects over its end face.

What is claimed is:

1. A reversible cutting bit for use in a cutting tool having a cutting bit holder with adjustment surfaces lying in three spatial planes and adapted for an identically oriented support of the cutting bit in reversed operation positions, said cutting bit comprising:

a plate-like body having parallel outer plate surfaces on opposite sides, two inside edge faces and two outside edge faces, said outside edge faces lying in planes at right angles to the outer plate surfaces and at an angle to each other, said plate-like body having a plurality of projections protruding over said inside edge faces in the direction of said outside edge faces and positioned at an angle to each other, each of said projections having an outside and an inside lateral surface, said outside lateral surface being an elongation of the corresponding outside edge face of said plate-like body and positioned in a plane at right angles to said outer plate surfaces of said plate-like body, said projections having end faces, each forming a cutting edge on a corresponding side of the opposite sides of said plate-like body, one of each of said outer plate surfaces of said outside edge faces and of said inside edge faces of said plate-like body forming bearing surfaces in the corresponding operation position of the bit.

2. A cutting bit according to claim 1, wherein the outside lateral surface of said projection passes into the corresponding outside edge face of said plate-like body at an obtuse angle of less than 180°.

3. A cutting bit according to claim 1, wherein the end face of at least one of said projections is positioned at right angles to the outer plate surfaces of said plate-like body.

4. A cutting bit according to claim 1, wherein said inside edge faces of said plate-like body are positioned at right angles to the outer plate surfaces thereof.

5. A cutting bit according to claim 1, wherein said outside edge faces of said plate-like body are positioned at right angles to each other.

6. A cutting bit according to claim 1, wherein at least one of said projections has a medial plane positioned rectangular to said median plane being positioned at right angles to one of said outside edge faces of said plate-like body, said one of said outside edge face being being positioned on the opposite side of the plate-like body with respect to said projection.

7. A cutting bit according to claim 1, wherein at least one of said projections provides a widened base portion, said base portion passing into the plate-like body and only projecting over the inside lateral surface of said projection.

8. A cutting bit according to claim 1, wherein at least one of said projection comprises a chip guide face associated with a cutting edge and the corresponding side of said plate-like body.

9. A cutting bit according to claim 1, wherein said chip guide face is extended into the base portion of said projection.

10. A cutting bit according to claim 1, wherein said plate-like body is provided with a locking bolt hole with a center axis for a locking bolt of the cutting bit holder, said locking bolt hole being positioned substantially at right angles to the outer plate surfaces and provided with bore portions adjacent to the two outer plate surfaces, said bore positions taper conically at acute angles to said centre axis and being adapted for receiving a conical bolt head of said locking bolt.

11. A cutting bit according to claim 10, wherein the inside edge faces of said plate-like body are positioned substantially approximately tangential to a largest circumference of the locking bolt hole.

12. A cutting bit according to claim 10, wherein boundary edges of chip guide faces remote from the cutting edges are substantially tangential to the largest circumference of a locking bolt hole.

13. A cutting bit according to claim 10 wherein the inside edge faces of said plate-like body passes into the widened base portion of the projection in the vicinity of an axial plane of a locking bolt hole which is substantially at right angles to said inside edge face.

14. A cutting bit according to claim 10, wherein the projection projects by an amount over the plate-like body the same the amount being substantially between the same or less than an edge width of the plate-like body.

15. A cutting bit according to claim 1, wherein the plate-like body has a square basic shape.

16. A cutting bit according to claim 1, wherein the largest width of the projection is less than half the width of the plate-like body measured in the same direction.

17. A cutting bit according to claim 1, wherein the projection in operating position on the cutting bit holder is at right angles to a longitudinal axis therefore and the other projection is located substantially in a longitudinal direction of said cutting bit holder and points away from a working end thereof.

18. A reversible cutting bit for use in a cutting tool having a cutting bit holder with adjustment surfaces laying in three spatial planes and adapted for an identically oriented support of the cutting bit in reversed operation positions, said cutting bit comprising:

a plate-like body having parallel outer plate surfaces on opposite sides, two inside edge faces and two outside edge faces, said outside edge faces lying at an angle to each other, said plate-like body having two projections protruding over said inside edge faces in the direction of said outside edge faces and positioned at an angle to each other, each of said projections having an outside and an inside lateral surface, said outside lateral surface being an elongation of the corresponding outside edge face of said plate-like body, and lying in a common plane therewith, said projections having end faces, each forming a cutting edge on a corresponding side of the opposite sides of said plate-like body, one of each of said outer plate surfaces of said outside edge faces and of said inside edge faces of said plate-like body forming bearing surfaces in the corresponding operation position of the bit.

19. A cutting bit according to claims 1 or 18, wherein in plan view, the said projection is widened towards its end face by an inclined position of its inside lateral surface.

* * * * *